United States Patent [19]

Greenwell et al.

[11] 4,043,442
[45] Aug. 23, 1977

[54] TRANSFER MECHANISM

[75] Inventors: Joseph Daniel Greenwell, Florence, Ky.; Eric W. Scarpa, Cincinnati, Ohio

[73] Assignee: R. A. Jones & Co. Inc., Covington, Ky.

[21] Appl. No.: 605,229

[22] Filed: Aug. 18, 1975

[51] Int. Cl.² .......................................... B65G 47/26
[52] U.S. Cl. ............................. 198/420; 198/433; 198/461; 198/492; 198/587; 198/817; 53/251
[58] Field of Search .................. 198/20, 21, 32, 34, 198/36, 40, 76, 95, 100, 102, 423, 424, 425, 461, 492, 575, 579, 587, 420, 433, 817; 53/251

[56] References Cited

U.S. PATENT DOCUMENTS

| | | | |
|---|---|---|---|
| 1,766,142 | 6/1930 | Olson | 198/20 R |
| 2,184,905 | 12/1939 | Brintnall | 198/34 |
| 2,475,617 | 7/1949 | Irmscher | 198/423 X |
| 2,940,580 | 6/1960 | Francois | 198/20 R X |
| 3,111,214 | 11/1963 | Heikinheimo | 198/34 |
| 3,187,878 | 6/1965 | Harrison et al. | 198/102 X |
| 3,237,751 | 3/1966 | Jonassen | 198/34 |
| 3,303,916 | 2/1967 | Burt | 198/20 R |
| 3,315,782 | 4/1967 | Eldred | 198/32 |
| 3,340,994 | 9/1967 | Anderson | 198/21 X |
| 3,590,978 | 7/1971 | Carnes et al. | 198/35 |
| 3,738,644 | 6/1973 | Kluge et al. | 198/423 X |
| 3,802,548 | 4/1974 | Wentz et al. | 198/40 |
| 3,920,134 | 11/1975 | Scarpa et al. | 53/251 X |
| 3,997,048 | 12/1976 | Hardy | 198/459 |

*Primary Examiner*—Evon C. Blunk
*Assistant Examiner*—Richard K. Thomson
*Attorney, Agent, or Firm*—Wood, Herron & Evans

[57] ABSTRACT

Apparatus for transferring pouches from a conveyor into product buckets of a cartoner. The pouches are deposited in shingled fashion in spaced groups on two slow moving parallel conveyors. Mounted on the same frame are two fast-moving conveyors which overlap the slower conveyors. At the junctions of the conveyors check and release mechanisms are provided which in the load engaging position raise the level of the slow conveyors above the fast ones and in the disengaged position raise the fast conveyors above the slow conveyors to facilitate the transfer. The pouches are transferred to the fast moving conveyors to increase the longitudinal separation between pouches. Two side-by-side groups of pouches are marshalled at the end of the fast moving conveyors by another check and release mechanism. The fast moving conveyors are swung alongside continuously moving product buckets, and during such swinging movement the pouches are deposited into the product buckets.

9 Claims, 6 Drawing Figures

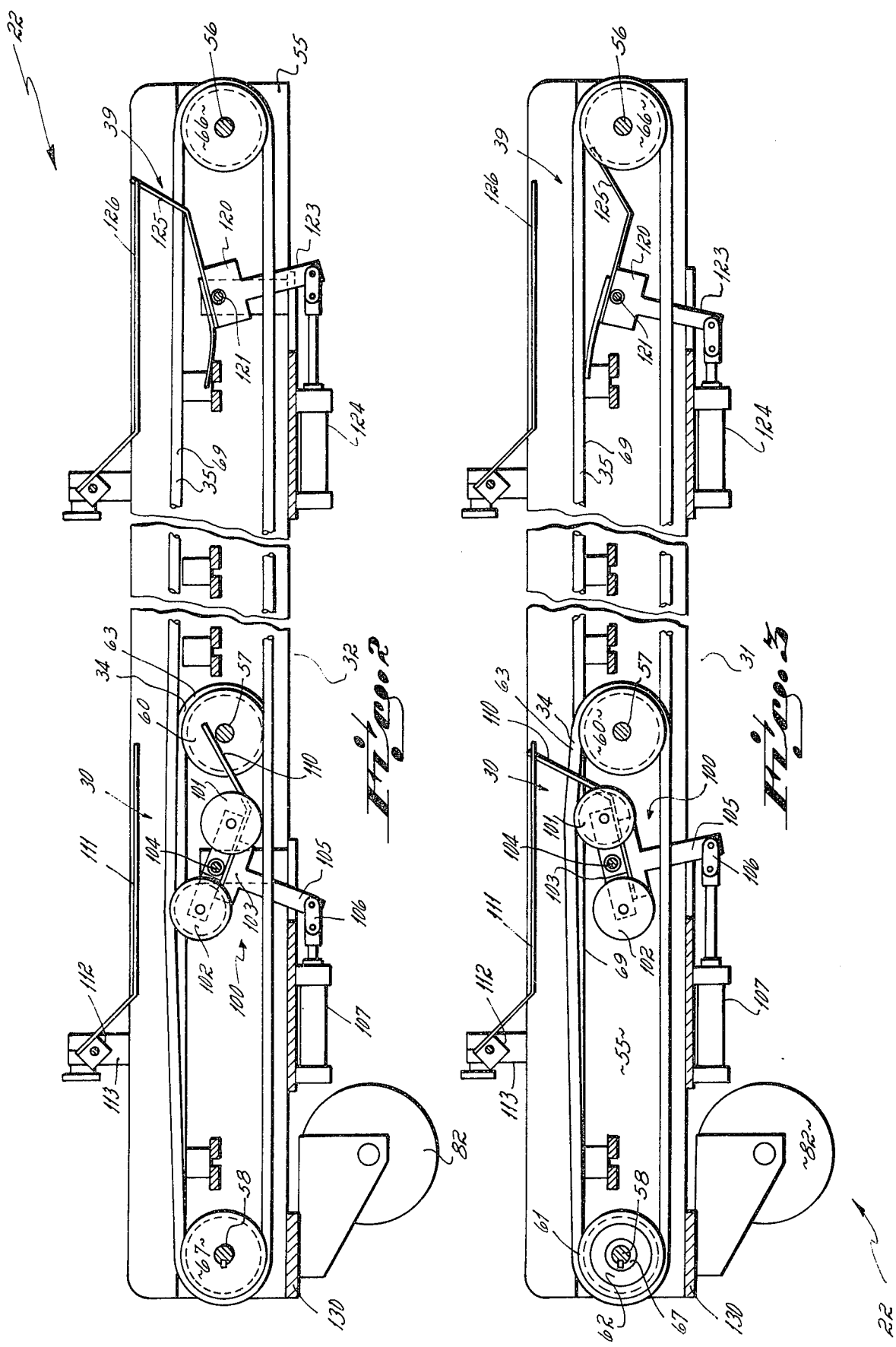

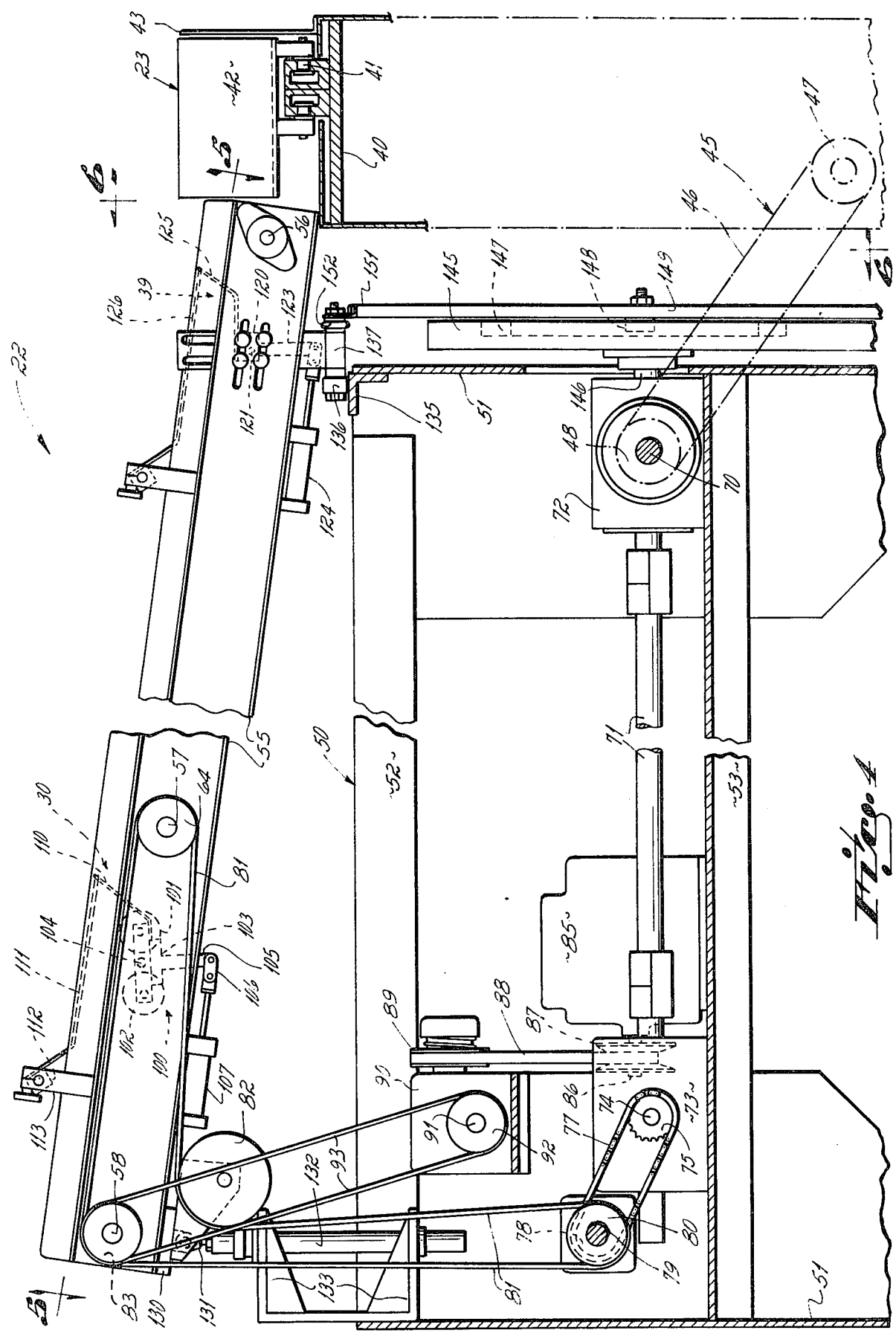

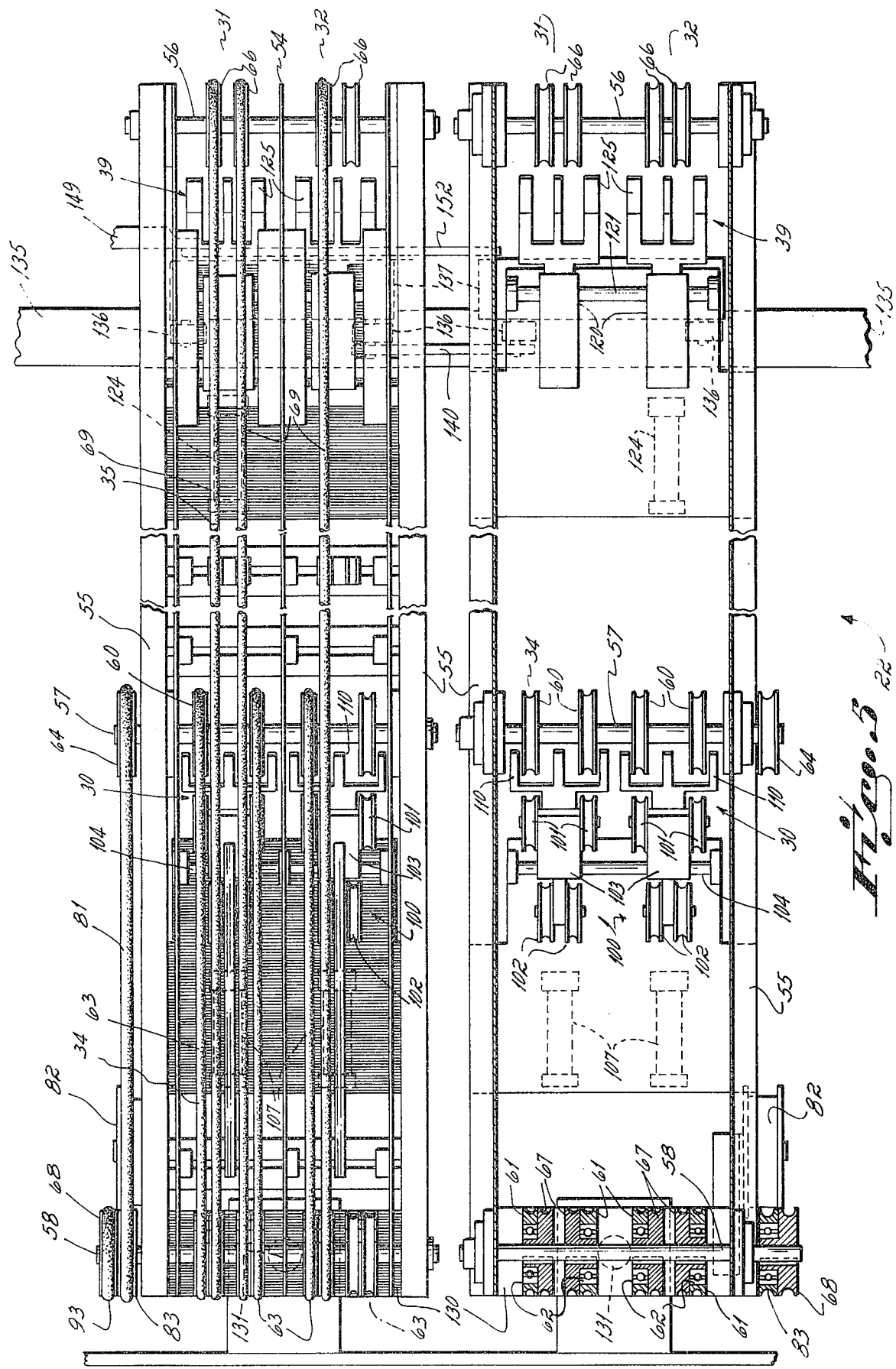

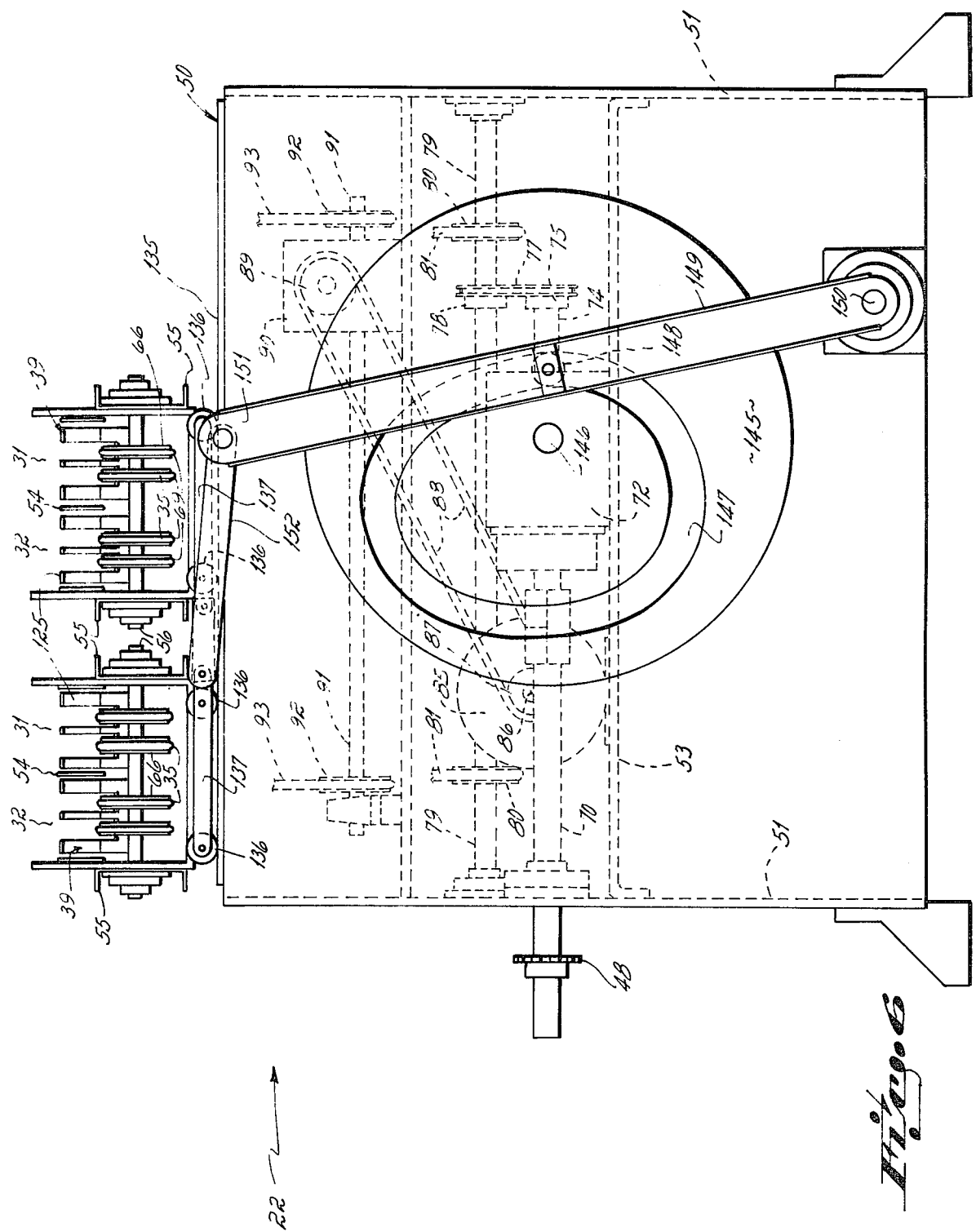

TRANSFER MECHANISM

This invention relates to apparatus for transferring pouches from a conveyor into product buckets of a cartoner.

Form, fill, seal machines for forming, filling and sealing flexible pouches with a fluid or particulate material have been known for many years. It has been desired to package groups of such pouches into cartons for sale to the consumers. Cartoning machines adapted to load groups of pouches into cartons have also been known for many years. In general, these cartoners include product bucket conveyors which receive stacked pouches and convey them along a path. A transport or carton conveyor conveys empty cartons alongside the path of the product buckets. A barrel loader engages the pouches and slides them from the product buckets into the open cartons. Thereafter, the cartons are closed and sealed.

The problem to which the present invention is addressed is that of transferring pouches from the form, fill, seal machine or poucher into the product buckets. While the invention is directed to the more difficult problem of transferring cartons into a continuously moving cartoner with continuously moving product buckets, the invention is also useful for making the transfer into the product buckets of an intermittent motion cartoner.

One known method of transferring the pouches into the product buckets is simply performing the operation manually. This method obviously has as its principal disadvantage the high cost of the labor required to perform the transfer.

Machines have been developed to perform the transfer operation, but in general these machines are complex, expensive and require considerable maintenance because of the many moving parts which are necessary in order to assemble a predetermined number of pouches into a group and thereafter to deposit that group into a product bucket.

An objective of the present invention has been to provide method and apparatus for transferring groups of pouches into product buckets, and more particularly, the objective of the invention has been to provide method and apparatus for assembling discrete pouches on a conveyor, effecting longitudinal transfer of the groups of pouches from the conveyor into the product buckets.

The objectives of the invention are attained in the following manner: upstream of the transfer apparatus the pouches are deposited into shingled groups, from the pouch forming machine, onto two parallel conveyors. In the pouch forming machines, pouches are formed, filled and sealed from a single web of material and, at the cutoff mechanism which severs individual pouches from the web, a preselected number of pouches is deposited on a first conveyor in shingled relation and a second group of pouches is then deposited on the adjacent conveyor in shingled fashion. The alternating deposit of groups of pouches between the two conveyors is continued throughout the operation of the apparatus.

The two lanes of pouches are fed onto the transfer apparatus which includes a pair of slow conveyors at the upstream end and a pair of fast conveyors at the downstream end of a transfer apparatus. The slow and fast conveyors have overlapping portions, and at the overlapping portions a check and release mechanism is provided. The check and release mechanism provides an initial compacting of the shingled pouches, but more importantly, simply holds each shingled group momentarily until the fast moving conveyor has its upper flight raised to engage the shingled group to convey the group away from the check and release mechanism. The higher speed of the fast moving downstream conveyor effects a longitudinal separation of the group from the next incoming group on the adjacent conveyor. The overlapping conveyors provide assurance that the entire group of shingled pouches will move together when the fast conveyor is raised.

At the downstream end of the transfer mechanism is a second check and release mechanism. The second check and release mechanism stops the oncoming pouches until two side-by-side groups of pouches are at the downstream end of the mechanism. When the two groups are assembled, the transfer mechanism swings alongside the product buckets and the check and release mechanism releases the pouches. The fast moving conveyor then thrusts the two groups of pouches from the transfer mechanism into the product buckets. Immediately thereafter the check and release mechanism returns to a check condition to capture the next two groups of pouches. Because of the longitudinal spacing of the pouches imparted to them by the combined action of the slow and fast conveyors, there is a space interval between the incoming pouches which provides time for the check and release mechanism to operate.

The downstream check and release mechanism and the means for swinging the transfer mechanism are driven directly from the cartoner so that the release of the pouches is always in timed relationship to the movement of the cartoner. The pouch forming machine is also driven in timed relation to the cartoner, for the flow of pouches from the pouch forming machine must coincide with the transfer of pouches into the product buckets.

The several features and objectives of the invention will become more readily apparent from the following detailed description taken in conjunction with the accompanying drawings in which:

FIG. 2 is a side elevational view of the transfer mechanism taken along lines 2—2 of FIG. 1;

FIG. 3 is a side elevational view of the transfer mechanism taken along lines 3—3 of FIG. 1;

FIG. 4 is a side elevational view of the transfer mechanism taken along lines 4—4 of FIG. 1;

FIG. 5 is a plan view of the transfer mechanism with the belts being removed from one section for clarity taken along lines 5—5 of FIG. 4;

FIG. 6 is a front elevational view of the transfer mechanism taken along lines 6—6 of FIG. 4.

GENERAL ORGANIZATION AND OPERATION

Figure 1:
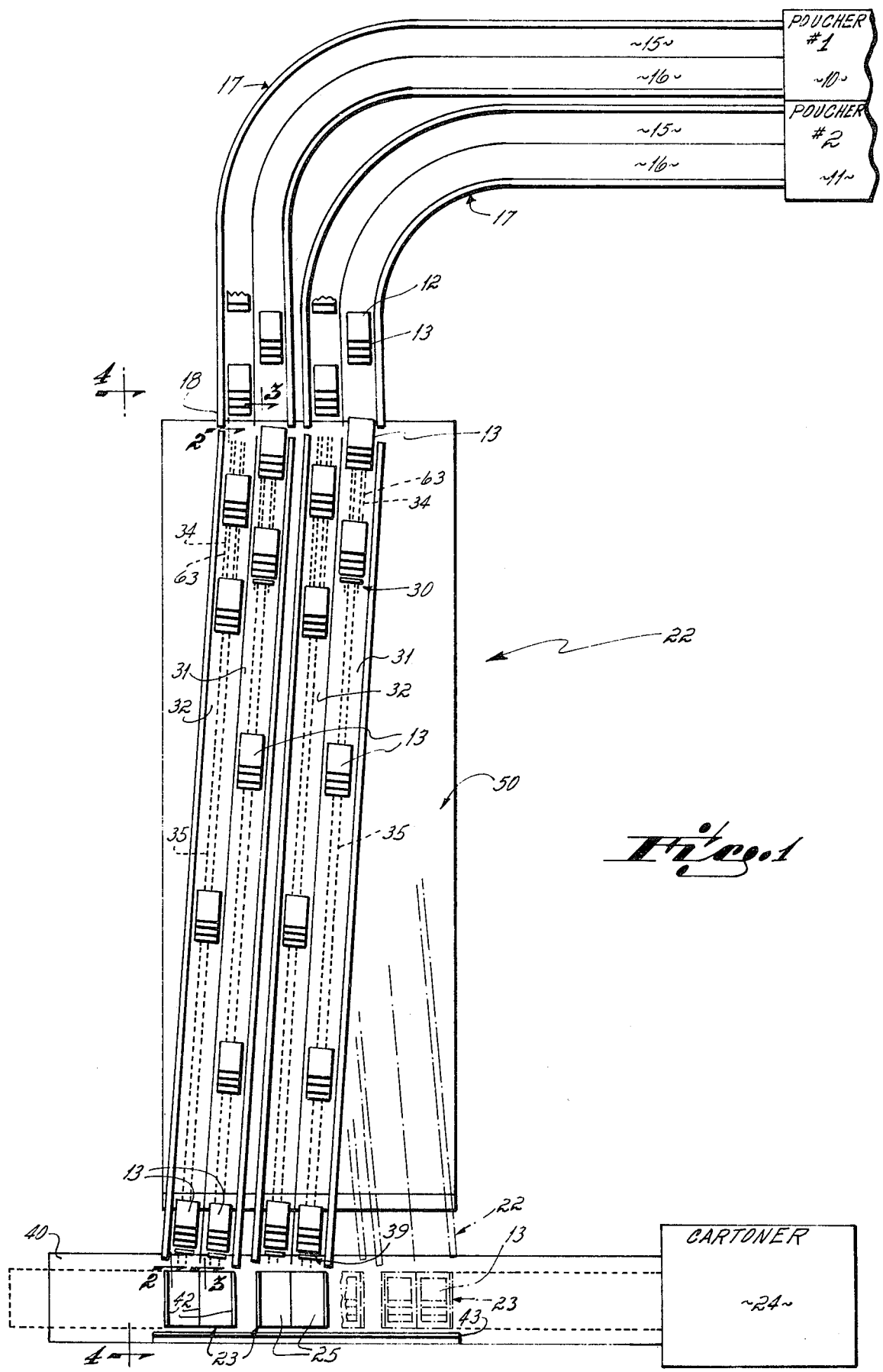
FIG. 1 is a diagrammatic plan view of the apparatus.

In the illustrated form of the invention, two pouching machines are shown feeding their pouches onto two sets of conveyors in order to feed pouches into two longitudinally spaced product buckets of a cartoner. The operation of each poucher and transfer mechanism is the same and, hence, only one will be described. It is to be understood of course that the invention is equally applicable to a system wherein a single poucher feeds pouches into a single product bucket. Other combinations are of course possible with slight modification of the apparatus, well within the skill of the art. For example, a single poucher can feed pouches into two product buckets or into three compartments of a single product bucket. The critical feature of these combinations is that the poucher be arranged to deposit pouches onto two or more conveyors. Further, while the invention in its illustrated and described form is particularly applicable to the feeding of pouches into a continuously moving product bucket conveyor, the invention is also applicable to feeding pouches into an intermittent motion cartoner.

Referring first to FIG. 1, two pouches 10 and 11 each form two rows of pouches 12, the pouches being shingled into separate groups 13 of four pouches in each group. Any desired number of pouches can be formed into a group by selectively operating the poucher. The pouch forming machine may be generally of the type described in Cloud U.S. Pat. No. 3,344,576. In that apparatus a web is folded and transversely sealed to form pockets. The thus formed pockets are filled and the top edges of the pockets, still in web form, are sealed to form pouches. The pouches are individually cut to sever the pouches from the web.

Preferably, the cutting apparatus is generally that which is disclosed in U.S. application Ser. No. 452,798, filed Mar. 20, 1974 now U.S. Pat. No. 3,961,697. That apparatus includes a wheel having suction cups spaced around its periphery, the suction cups holding the individual pouches after they are severed from the web. A pneumatic system selectively holds and then releases, under positive pressure, the pouches onto a conveyor passing underneath the wheel and running parallel to the axis of the wheel. The conveyor has two transversely spaced sections for receiving pouches, and the pouches are selectively and alternately deposited on the respective sections to form two rows of pouches.

In the present invention, that apparatus is modified to the extent of providing for the release of four (or any desired number) shingled pouches on a first conveyor section 15 and then four shingled pouches on the second conveyor section 16. The apparatus continues to alternate in that fashion to deposit pouches in a staggered relation on the two conveyor sections 15 and 16 as illustrated, these two sections 15 and 16 forming a pouch conveyor 17. The pouches are conveyed by the conveyor 17 to its downstream end 18 in the staggered relationship illustrated.

It should be understood that the apparatus could be modified to drop more than two rows of shingled pouches onto more than two conveyors. In this event, the transfer mechanism would be provided with as many conveyor sections as needed to accommodate the incoming rows of pouches.

It should also be understood that the specific illustrated staggered relationship is more likely to be present when the conveyor 17 is linear. When the conveyor 17 is curvilinear, as illustrated, and the conveyors are running at the same speed, the pouches on the inside section 16 will tend to catch up with the pouches on the outside section 15, thereby altering the staggered relationship illustrated, but that difference will not change the operation of the invention. It does tend to create a longitudinal gap between pairs of pouch groups 13, which is desirable.

Downstream from the conveyor 17 is the transfer mechanism 22 which feeds the pouches into continuously moving product buckets 23 forming a part of a cartoner 24 of a type well known in the art.

Each product bucket has two compartments 25, each compartment being adapted to receive a group of four pouches. In the cartoner, two groups of four will be loaded into a carton by the barrel loading mechanism in common use with cartoners.

The transfer mechanism 22 has several functions. Principal among them are the increasing of the longitudinal spacing between groups of pouches 13 and the transferring of pairs of pouch groups 13 from the transfer mechanism into the product buckets.

The mechanisms which increase the longitudinal spacing of the pouch groups include a first or upstream check and release mechanism 30 for each conveyor section 31 and 32 of the transfer mechanism. Further, each conveyor section has an upstream set of conveyor belts 34 which are moving slowly, that is, at about the speed of the conveyor sections 15 and 16 of conveyor 17. The conveyors 31 and 32 also have a set of downstream belts 35 which are fast moving belts compared to the upstream belts 34. The fast belts 35 overlap at least a portion of the slow belts 34. The check and release mechanisms 30 are located in the area where the fast and slow belts overlap.

In the operation of this portion of the transfer mechanism, each group of pouches 13 arrives under the motive power of the slow belts at its respective check and release mechanism and is held there only momentarily. Then, simultaneously with the release of the group of pouches by the check and release mechanism, the fast belts 35 are elevated above the plane of the slow belts so as to pick up the group of pouches and convey it rapidly away from the check and release mechanism. As soon as the group of pouches 13 has passed the check and release mechanism, the fast belts 35 are lowered and the slow belts bring the next upstream group of pouches 13 to the check and release mechanism. That operation takes place for both sections 31 and 32 with the result that the pouches on the fast belts 35 have a substantial longitudinal separation imparted to them as illustrated in FIG. 1.

At the downstream end of the sections 31, 32, a second check and release mechanism 39 is provided. That check and release mechanism holds the first to arrive group of pouches 13 until the second group of pouches 13 arrives. The two groups are momentarily held together at the downstream end of the transfer mechanism, as shown in FIG. 1, until the product buckets 23 have moved into position to receive a deposit of two groups of pouches. At this time, a mechanism to be described below, causes the downstream end of the transfer mechanism to swing alongside the product bucket conveyor at approximately the speed of the product bucket conveyor while simultaneously the check and release mechanism 39 shifts its condition from check to release. The fast moving belts 35 impart a thrust to each group of pouches to discharge the two groups simultaneously into the respective compartments 25—25 of the product bucket.

The foregoing operation has been described in connection with a single transfer mechanism consisting of two conveyors 31 and 32. However, as illustrated in FIG. 1, two such transfer mechanisms are ganged together and their downstream check and release mechanisms 39 are spaced simultaneously to cause two product buckets to be filled simultaneously.

The Transfer Mechanism

Referring to FIG. 4, the transfer mechanism 22 is shown for feeding pouches into the product buckets 23. The product buckets are supported on a conventional base 40 and are conveyed by an endless chain 41. Each product bucket has three vertical walls 42 to form the two compartments 25. A stationary vertical wall 43 is mounted on the supporting structure 40 to provide a backstop against which the pouches are thrust when they leave the transfer mechanism 22.

The transfer mechanism 22 is located adjacent the product bucket conveyor and is driven directly from the cartoner drive by a transmission diagrammatically indicated at 45 and consisting of an endless chain 46 passing over a drive sprocket 47 and a driven sprocket 48. The transfer mechanism is supported on a base 50 which includes upright members 51 which support upper longitudinal members 52 and lower longitudinal members 53.

Two transfer mechanisms are illustrated as being supported on the base 50. Each includes a pair of spaced longitudinal frame members 55 which support between them the two conveyor sections 31 and 32 separated by a divider 54. Each conveyor section 31 and 32 is identical to the other and one will be described. The frame carries a downstream shaft 56, a central shaft 57 and an upstream shaft 58. The shaft 57 carries four "slow" pulleys 60 which cooperate with four slow pulleys 61 which are mounted on the shaft 58. The pulleys 61 are mounted on roller bearings 62 so as to be freely rotatable with respect to the shaft 58. The slow pulleys carry endless round belts 63 which provide the conveying surface for the slow conveyor 34. The slow conveyor 34 is driven from a pulley 64 fixed to the central shaft 57 which is driven by a transmission system to be described below.

The downsteam shaft 56 carries four "fast" pulleys 66 which are fixed to the shaft 56, the shaft being journalled in the longitudinal frame members 55. Cooperating fast pulleys 67 are fixed to the shaft 58. A drive pulley 68 is fixed to the shaft 58 and is driven through a transmission system to be described below. Endless fast belts 69 pass around the fast pulleys to provide the conveying surface for the fast conveyor.

The transmission system is best seen in FIGS. 4 and 5. The belts 34 and 35 are driven from the cartoner through the transmission 45. The chain 46 is fixed to a shaft 70 which is connected to a gear box 72 having an output shaft 71. The shaft 71 is connected to a second gear box 73 having an output shaft 74 to which sprocket 75 is fixed. An endless chain 77 passes over the sprocket 75 and drives a sprocket 78 fixed to a shaft 79. A pulley 80 is fixed onto the shaft 79 and carries a belt 81 which passes over an idler pulley 82 and an idler pulley 83 and drive pulley 64 which is fixed on shaft 57 to drive the slow belts 34.

The fast belts 35 are driven from a variable speed motor 85 whose output shaft 86 carries pulley 87. The pulley 87 carries a belt 88 passing over pulley 89 which is connected to a gear box 90. The gear box 90 has an output shaft 91 carrying a pulley 92 over which a belt 93 passes. The belt 93 is connected directly to the pulley 68 which is fixed on the shaft 58 to drive the fast belts 35.

In the organization shown, the fast belts of each section 31, 32 pass between the slow belts 34. Under normal conditions, the supporting surface provided by the slow belts is slightly above the supporting surface provided by the fast belts. A belt shifting mechanism 100 associated with each conveyor section 31, 32 is provided to shift the level of the belts to raise the fast belts above the slow belts. The belt shifting mechanism is associated with the upstream check and release mechanism 30 so that when the fast belts are raised, the check and release mechanism is shifted to release the pouches, thereby releasing the pouches from the slow belts onto the fast belts. The belt shifting mechanism consists of a pair of slow idler pulleys 101 which are engageable with the slow belts and a pair of fast idler pulleys 102 engageable with the fast belts. The pulleys are mounted at respective downstream and upstream ends of a bracket 103, the bracket being pivoted on a rod 104. As shown in FIG. 4, the bracket has a depending arm 105 which is connected through a link 106 to a double acting pneumatic piston and cylinder 107. Actuation of the piston and cylinder 107 causes the fast and slow pulleys to shift positions as follows: when the piston rod is extended, the slow pulleys 101 are elevated to bring the slow belts 63 into operative supporting relation with the pouches. When the rod is retracted, the fast pulleys 102 are elevated with respect to the slow pulleys 101 to bring the fast belts 69 into operative engagement with the pouches.

The check and release mechanism is formed by a three pronged gate 110 which is secured to the downstream end of the bracket 103 so that when the bracket is swung to a position raising the downstream slow idler pulleys 101, the gate 110 is also raised to block downstream movement of the pouches. Conversely, when the bracket is shifted to bring the fast belts 69 up with respect to the slow belts, the gate lowers to permit the passage of the pouches.

Overlying the check and release gate 110 is a plate 111 which is adjustably mounted at is upstream end 112 to a pair of brackets 113 fixed to the frame members 55. The plate 111 has a section lying generally parallel to the conveyor belts and it cooperates with the gate as well as the continuously moving belts to cause the shingled group of pouches to assume a more tightly packed orientation with respect to one another. This feature may or may not be necessary depending upon the size of the pouches, slipperiness of the pouch surfaces and the like.

Each check and release mechanism 30 is operated in timed relation to the rest of the mechanism so as to engage an incoming group of pouches only momentarily and thereafter to release the pouches. The two gates will not operate simultaneously but rather will operate alternately as each receives a group of pouches alternately deposited on the respective conveyors by the pouch forming machine.

At the downstream end of the transfer mechanism is the check and release mechanism 39. The mechanism is likewise mounted on a bracket 120 which is fixed to a shaft 121, the shaft being journalled in the frame members 55. One of the brackets has a depending arm 123 which is fixed to a pneumatic double acting piston and cylinder 124 to rotate the shaft 121 and the brackets 120 which it carries. The check and release mechanism 39 is formed by a three pronged gate 125, the prongs passing between the fast belts 69. The two gates 125 are operated simultaneously and in timed relation to the movement of the product buckets past the transfer mechanism so as to release two groups of pouches simultaneously when the downstream end of the transfer mechanism is aligned with the respective product buckets.

An adjustable overlying plate 126 may also be employed above the check and release mechanism to keep the shingled group of pouches properly oriented.

Each transfer mechanism has a horizontal plate 130 fixed to the lower edges of the frame members 55 at their upstream ends. The plate is pivotally mounted (FIG. 4) at 131 to rod 132 which is in turn adjustably mounted on brackets 133 fixed to the base 50. The pivotal mounting at 131 permits the downstream end of the transfer mechanism to swing about the pivot 131 as described.

The downstream end of the transfer mechanism is supported on an angle member 135 fixed to the base 50. A pair of rollers 136 is carried by a bracket 137 which depends from and is fixed to the frame members 55 so as to provide an anti-friction support for the downstream end of the transfer mechanism, thereby permitting the downstream end of the transfer mechanism to roll back and forth as it swings about the pivot 131.

The two transfer mechanisms in the illustrated form of the invention are tied together by a transverse link 140 so that the swinging of one transfer mechanism imparts swinging motion to the other.

The swinging of the transfer mechanism is effected by a cam 145 (FIG. 6) mounted on an output shaft 146 driven from the gear box 72 (FIGS. 4 and 6). As best shown in FIG. 6, the cam 145 has a generally elliptical cam track 147 which cooperates with a follower roller 148 mounted on an arm 149 which is pivoted to the base at 150. The upper end 151 of the arm 149 is connected by a link 152 to one of the transfer mechanisms 22. Since the cam is driven from the gear box 72 and the gear box is directly tied to the cartoner, the cam will cause the transfer mechanisms always to swing in timed relation to the product buckets. The pneumatic system for the check and release 39 is also tied to the cartoner, through cams not shown, so as to operate the check and release 39 in timed relation with the product buckets and the swinging movement of the transfer mechanism.

Operation

In operation the two pouch forming machines 10, 11 are tied together to operate at the same speed. Each forms pouches from a single web and, using the cutting mechanism with its selectively operated transfer wheel, deposits, alternately, a first group of shingled pouches 13 on conveyor section 16 and then a second group of pouches 13 on the other conveyor section 15, with the deposit of alternating groups of pouches continuing through the operation of the machine. The pouches are thus conveyed to the transfer mechanism. At the transfer mechanism the pouches pass to the slow belts 34 which may be driven slightly slower than the conveyor sections 15 and 16 to effect a first bunching up or compacting of the shingled relation of the pouches if desired.

Each group of pouches 14 is conveyed in staggered relation by the slow belts on the respective conveyors 31 and 32. A first group, for example on conveyor 31, moves into engagement with the upstanding prongs of the check and release gate 110 where it is held momentarily. The group of pouches is then released by the clockwise swinging of bracket 103 (as viewed in FIG. 4) which lowers the gate 110 along with the slow idler pulleys 101. Simultaneously, the fast idler pulleys are raised into engagement with the fast belts 35 to raise the level of the fast belts above that of the slow belts whereby the complete group of pouches comes under control of the fast belts 35. As soon as the group passes the gate 110, the bracket 103 is rotated in a counter-clockwise direction to return it to its original condition, bringing the gate up and reversing the position of the fast and slow belts so that the incoming pouches are under control of the slow belts. That same operation occurs upon the arrival of the second group of pouches at the check and release mechanism 30 on the adjacent conveyor 32.

Since the incoming pouches are carried by the slow belt and the downstream pouches are conveyed by the fast belts, which operate from two and one-half to three times as fast as the slow belts, a substantial increase in the longitudinal spacing between adjacent groups of pouches occurs.

This longitudinal spacing permits the operation of the downstream check and release to occur before the arrival of the next group of pouches.

At the downstream end of the transfer mechanism, a first group of pouches from the right-hand section 31, as viewed in FIG. 1, is received and held at its gate 125. As soon as the second group of pouches from the left-hand lane 32 reaches the check and release, the product buckets should be substantially in alignment with the downstream end of the transfer mechanism. At this point, the cam 145 causes the transfer mechanism to swing from left to right, as viewed in FIG. 1, at approximately the speed of the product buckets and simultaneously the check and release 39 is operated to lower the gates 125 to deposit all four groups of pouches into the respective chambers 25 of the product buckets 23. After the pouches have passed into the product buckets, the gates 125 are immediately returned to their upper position blocking the incoming groups of pouches.

The relationship of the elements is preferably timed so that the deposit of the pouches occurs in about one-fourth of a cycle of operations, thereby leaving a comfortable three-fourths of a cycle for the return of the check and release and the return of the transfer mechanism to its original position.

We claim:

1. Transfer mechanism for pouches comprising:
   a frame,
   a plurality of slow upstream conveyors on said frame,
   means for depositing shingled groups of pouches on said upstream conveyors in longitudinally staggered relation,
   a plurality of fast downstream conveyors on said frame and having upstream ends overlapping at least the downstream ends of said slow conveyors,
   first check and release means at the intersection of said fast and slow conveyors,
   and second check and release means at the downstream ends of said fast conveyors,
   said upstream and downstream conveyors each comprising a plurality of thin endless belts passing over spaced pulleys,
   and means for selectively raising the belts for the slow conveyors when said first check and release means checks said pouches and raising said belts for said fast conveyors when said first check and release means releases said pouches.

2. Transfer mechanism as in claim 1 in which said first check and release means comprises:
   a bracket pivotally mounted on said frame,
   a gate fixed to said bracket and being pivotable into a position above said belts to block movement of said pouches, at least one idler pulley engageable with said slow belts and mounted on one side of said bracket, at least one idler pulley engageable with said fast belts and mounted on the other side of said bracket, and means for pivoting said bracket in a first direction to raise said gate and slow idler pulleys, and to pivot said bracket in the opposite direction to lower said gate while raising said fast idler pulleys.

3. Transfer mechanism comprising:

two longitudinally extending transversely spaced frame members, at least one endless slow belt supported between said frame members at the upstream end of said mechanism, means for driving the slow belts, means for depositing groups of shingled pouches on said slow belt in longitudinally spaced relation, at least one endless fast belt supported between said frame members at the downstream end of said mechanism, said fast belt overlapping at least a portion of said slow belt, means for driving said fast belt faster than said slow belt, a check and release mechanism located at the overlapping portion of said belts to normally block movement of said pouches, and means for moving said check and release mechanism out of the path of said pouches while raising said fast belt with respect to said slow belt.

4. Transfer mechanism as in claim 3 in which said driving means includes means for varying the ratio of the speeds of said fast and slow belts.

5. Transfer mechanism as in claim 3 further comprising:

an upstream shaft, a downstream shaft and a central shaft mounted between said frame members, a plurality of fast pulleys mounted on said downstream shaft, a plurality of slow pulleys mounted on said central shaft and laterally spaced from said fast pulleys, a plurality of fast and slow pulleys mounted on said upstream shaft and aligned with the respective fast and slow pulleys on the downstream and central shafts, and endless belts passing around said pulleys.

6. Transfer mechanism as in claim 3 further comprising a longitudinally extending divider mounted between said two frame members to create two side-by-side conveyor sections.

7. Transfer mechanisms as in claim 6 in which, said check and release mechanisms located at the intersection of said slow and fast belts in each conveyor section are independently operable, and simultaneously operable check and release mechanisms located at the downstream ends of said fast belt conveyor sections.

8. Transfer mechanism as in claim 3 further comprising a belt shifter comprising, a pivotal bracket slow idler pulleys mounted on one side of said bracket and engageable with said slow belts, fast idler pulleys mounted on the other side of said bracket and engageable with said fast belts, and means for rotating said brackets to selectively raise either of said fast or slow idler pulleys.

9. Transfer mechanism as in claim 3 further comprising, a gate mounted on said bracket and projectable above said belts when said slow idler pulleys are raised, and a plate overlying said gate and spaced above said bracket to assist in compacting a group of shingled pouches.

* * * * *

UNITED STATES PATENT AND TRADEMARK OFFICE
CERTIFICATE OF CORRECTION

PATENT NO. : 4,043,442

DATED : August 23, 1977

INVENTOR(S) : Joseph Daniel Greenwell; Eric W. Scarpa

It is certified that error appears in the above-identified patent and that said Letters Patent are hereby corrected as shown below:

Col. 9, line 31, Claim 4, "saiddriv-" should be -- said driv --

Col. 10, line 30, claim "3" should be -- claim 8 --

Signed and Sealed this

Fourteenth Day of March 1978

[SEAL]

Attest:

RUTH C. MASON
Attesting Officer

LUTRELLE F. PARKER
Acting Commissioner of Patents and Trademarks